Aug. 8, 1939.  P. H. CRAIG  2,168,952
VOLTAGE REGULATOR
Filed Dec. 14, 1936   4 Sheets-Sheet 1

Inventor
Palmer H. Craig
By Ralph B. Stewart
Attorney

Aug. 8, 1939.     P. H. CRAIG     2,168,952
VOLTAGE REGULATOR
Filed Dec. 14, 1936     4 Sheets—Sheet 2

Inventor
Palmer H. Craig,
By Ralph B. Stewart
Attorney

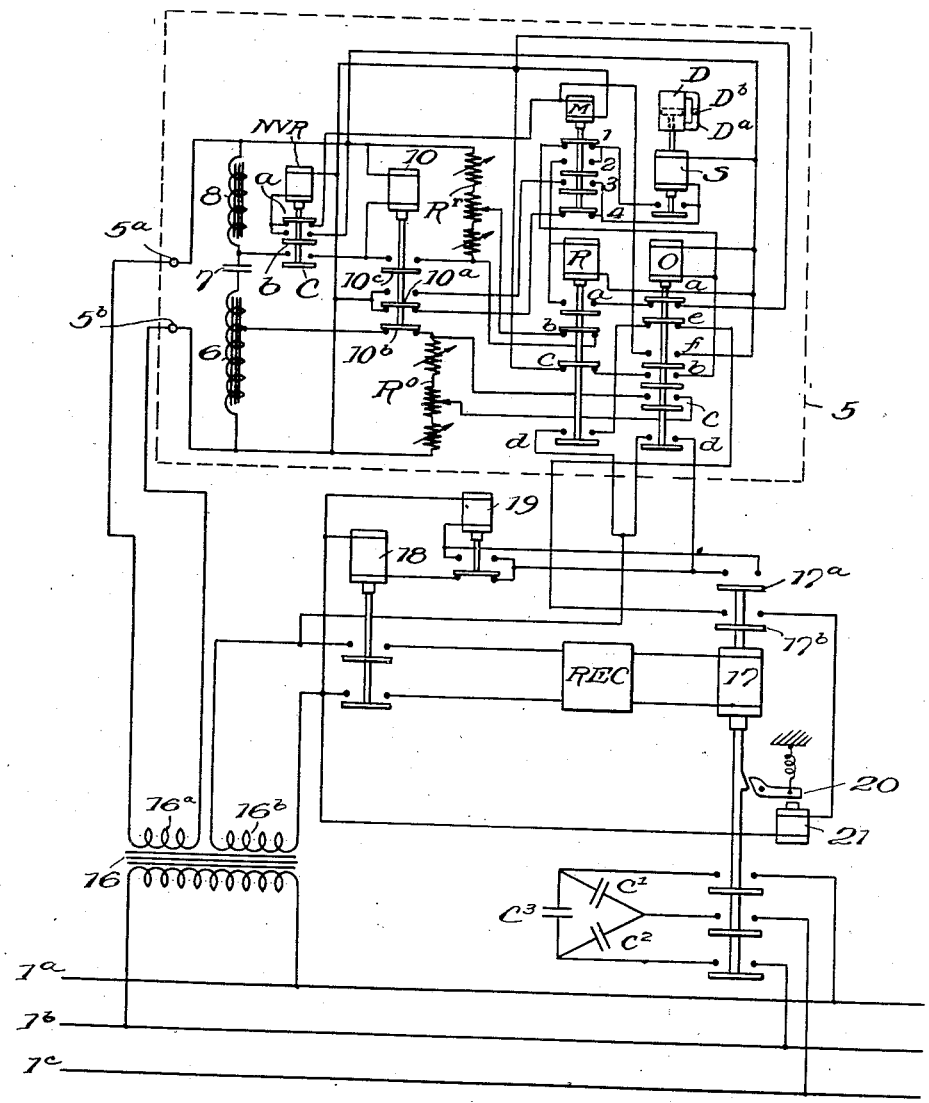

Aug. 8, 1939.  P. H. CRAIG  2,168,952
VOLTAGE REGULATOR
Filed Dec. 14, 1936  4 Sheets-Sheet 4
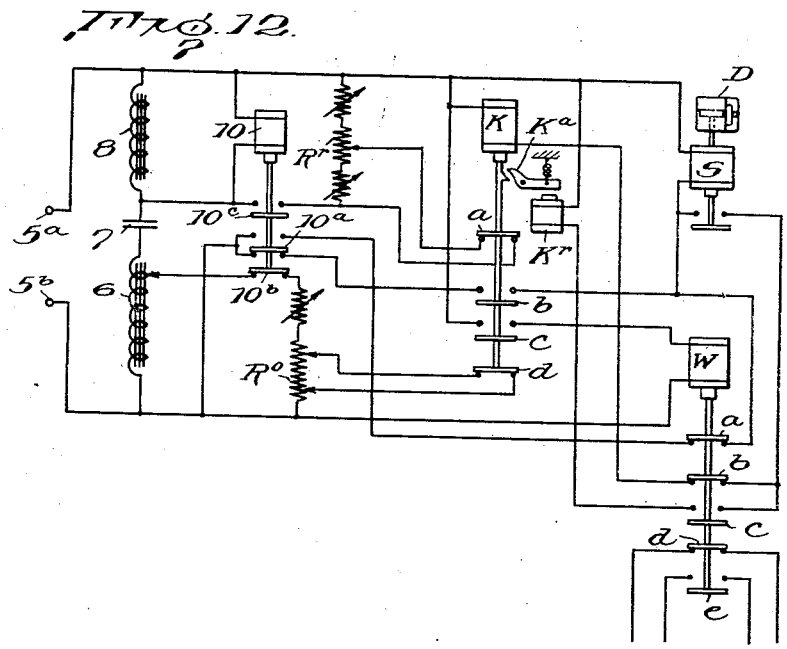
Inventor
Palmer H. Craig,
By Ralph B. Stewart
Attorney Patented Aug. 8, 1939

2,168,952

UNITED STATES PATENT OFFICE 2,168,952

VOLTAGE REGULATOR

Palmer Hunt Craig, Bethlehem, Pa., assignor to Invex Corporation, a corporation of New York Application December 14, 1936, Serial No. 115,844

17 Claims. (Cl. 171—119)

This invention relates to electric regulators and in particular to regulators for controlling the voltage on electric supply lines. My invention also relates to voltage-sensitive circuits for use in electric regulator systems.

An object of the present invention is to devise a regulator system for automatically increasing the voltage on electric supply lines in one or more definite steps when the voltage drops below a given value and to automatically lower the voltage in one or more definite steps when the voltage increases to a higher given value.

A further object is to devise a voltage sensitive regulator circuit in which a ferro-resonant circuit is employed to energize an electromagnetic relay for increasing or decreasing the line voltage in definite steps in response to the voltage condition of said line.

A further object is to devise a voltage-sensitive circuit for operating a relay of ordinary construction, that is, a relay having a pick-up or "operate" current many times larger than the drop-out or "release" current.

Still another object is to devise a voltage-sensitive relay circuit which will operate an ordinary relay at a definite voltage value and will cause the release of said relay at a voltage value only slightly removed from the operate value.

A further object of my invention is to devise a voltage sensitive circuit in which an electromagnetic relay is energized from a ferro-resonant circuit and in which means is provided to delay the operation of the relay, whereby the relay will not respond to line voltage changes of short duration.

The ferro-resonant voltage-sensitive circuits employed in my invention have a characteristic such that for increasing applied voltage they resonate at given voltage value and the current flowing in the circuit suddenly increases from a low value to a relatively high value, but for decreasing voltage, the current remains at a relatively high value until the "dissonant" voltage is reached, which is comparatively widely separated from the resonant voltage, and then suddenly drops to a low value. The tendency of the current to lag behind the changes in voltage, which results in the displacement of the "dissonant" and "resonant" voltages in ferro-resonant circuits, is sometimes referred to as the "hysteresis" effect. This effect is more pronounced in circuits of low resistance.

A further object of the present invention is to secure operation and release of the relay for relatively small change in the line voltage while maintaining the circuit characteristic substantially unchanged, that is, while still maintaining a characteristic with a pronounced hysteresis effect. This object is attained by providing means responsive to the operation of the relay for changing the reactive values of the resonant circuit to shift the resonant point of the circuit to a higher value of voltage and to bring the dissonant point of the characteristic to a voltage slightly below the resonant point before the relay operated.

While the voltage-sensitive circuits, disclosed herein are shown as applied to regulator systems operating on the "step" principle, it will be understood that these circuits are useful generally and in any situation where a voltage-sensitive circuit is desirable.

Various modifications of my invention are illustrated in the accompanying drawings in which.

Figure 11 is a circuit diagram of a regulator system wherein the voltage on a transmission line is controlled by connecting and disconnecting condensers across the line and wherein time delay means is provided to prevent operation of the voltage regulating relay except for voltage changes of a predetermined duration; and Figure 12 is a modification of the voltage-sensitive control circuit shown in Figure 11.

Figure 1:
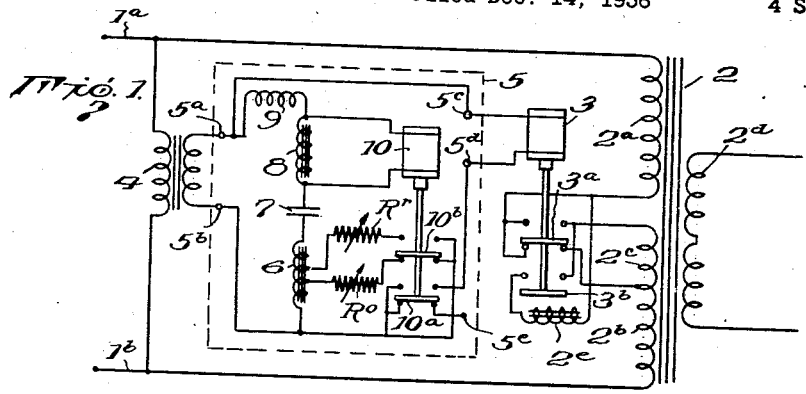
Figure 1 is a circuit diagram showing one form of my regulator applied to a distribution transformer on a feeder circuit.

Referring to Figure 1, the two conductors $1a$ and $1b$ of a transmission line are connected to a distribution transformer 2 having a primary winding divided into three sections $2a$, $2b$ and $2c$, respectively, and a secondary winding $2d$ supplying the low voltage load circuit, not shown. A relay 3 having a movable contact 3a is arranged to normally connect primary winding sections 2a and 2b in series across the line, and, when the relay 3 is energized, the contact 3a connects all three primary winding sections in series across the line. To prevent opening of the primary circuit, contact 3b on relay 3 connects a reactor 2e between winding sections 2a and 2c before contact 3a breaks its lower contact on operation of relay 3, and until after it makes its lower contact on release of relay 3. It will be understood that when relay 3 is de-energized, the secondary voltage will be greater than when the relay is energized, due to the change in transformation ratio. In ordinary construction, the distribution transformer 2 will have taps on the primary winding for securing either 2½% boost or 5% boost, and relay 3 will be arranged to control the tap connections to secure the desired amount of boost.

Relay 3 is energized from the line conductors 1a and 1b through a suitable step-down transformer 4 and a voltage sensitive circuit shown in the dotted rectangle 5. This voltage-sensitive circuit consists of a tuned series circuit connected across the input terminals 5a—5b and comprising a saturable iron-cored coil 6 connected in series with a condenser 7, an iron-cored inductance coil 8 and a temperature compensating coil 9. A relay 10 is connected across the coil 8 and is provided with a contact 10a for controlling the circuit to relay 3. Relay 10 is also provided with a movable contact 10b which in its lower position connects a variable resistance Ro in shunt to a portion of reactor 6, and in its upper position connects a variable resistance Rr in shunt to a portion of reactor 6. Relay 3 is connected to output terminals 5c—5d and is supplied with operating current from the input terminals 5a—5b through contact 10a when relay 10 is energized. If desired, transformer 4 may be omitted and input terminals 5a and 5b may be connected to suitable taps on the primary winding of transformer 2. In Figure 1, reactor 6 is preferably unsaturated or only slightly saturated.

The operation of Figure 1 is as follows: The constants of the tuned circuit 6—7—8 are chosen so that at the highest desired line voltage (usually the normal no-load voltage) the circuit will resonate and operate relay 10. The voltage at which the circuit resonates can be adjusted by varying resistance Ro which controls the effective inductive reactance of reactor 6 when relay 10 is not operated.

It will be assumed that the circuit is adjusted to resonate at a voltage corresponding to a load circuit voltage of 125 volts (with boost). It will further be assumed that a 5% boost in voltage is introduced in the load circuit when relay 3 is in its normal or de-energized position, and this boost is removed when the relay 3 is energized. Roughly, on a 120 volt circuit this means a boost of 6 volts. So long as the line voltage is below a value corresponding to 125 volts on the load circuit (with boost), the circuit arrangement is as shown in Figure 1, and a 5% boost is introduced on the load circuit. When the line voltage rises (as by reason of a reduction of load on the line) to such a value that the load voltage increases to 125 volts, the resonant circuit 6—7—8 goes into resonance and operates relay 10 which in turn energizes relay 3, and operation of this relay removes the boost from the line and reduces the load voltage to approximately 119 volts. Resistance Rr is adjusted to control the point of dissonance of the resonant circuit (which also is the point of release of relay 10), and it will be assumed that this resistance is adjusted so that relay 10 will release when the line voltage drops to a value corresponding to 115 volts on the load circuit (without boost). Thus, in case the line voltage drops below this definite limit, relay 10 releases and de-energizes relay 3 which in turn operates to introduce a 5% boost in the load circuit voltage. This raises the load circuit voltage to 121 volts. It is clear that by properly adjusting resistances Ro and Rr, the resonant relay circuit may be made to introduce the boost at any desired low value of line voltage and to remove the boost at any desired higher value of voltage within the limits of the resonant circuit characteristic.

Figure 5:
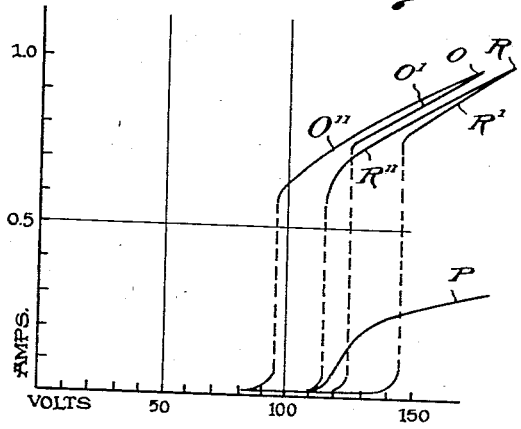
Figure 5 is a series of curves for explaining the operation of the voltage-sensitive circuits.

The operation of the voltage-sensitive circuit may be better understood by reference to Figure 5. The curves shown in this figure are not intended to represent a circuit of any particular constants, but the shapes of the curves are characteristic of the series resonant circuits employed in my invention and will serve to illustrate the principle of operation. The curve O illustrates the characteristic of the circuit when relay 10 is in its lower position and with resistance Ro connected in shunt to a portion of reactor 6. As shown, the current flowing in the circuit is very small as the voltage increases from zero up to 125 volts at which point the current suddenly increases from a value of the order of 0.1 of an ampere to approximately 0.7 ampere. This is the resonant voltage of the circuit. As the voltage increases beyond 125 volts, the current increases according to the portion O′ of the curve O. As the voltage impressed on the circuit decreases from some high value, the current in the circuit decreases according to portion O″ of the curve O until it reaches a lower voltage than the resonant voltage and then suddenly decreases to a very small value. This point is called the "dissonant" point, and for curve O this point occurs at approximately 95 volts and the current decreases approximately from 0.55 ampere down to less than 0.1 ampere. It will thus be seen that with resistance Ro connected in shunt to a portion of reactor 6, the dissonant voltage is approximately 30 volts lower than the resonant voltage. In order to have the relay 10 release at the desired low value of voltage, and at the same time retain the full advantage of a large decrease in current at the dissonant point, resistance Rr is connected in shunt to a portion of reactor 6 when relay 10 operates, and this resistance shunts a portion of the current around reactor 6, requiring more current (and thus more impressed voltage) to saturate reactor 6, and thereby shifts the characteristc curve of the resonant circuit into the higher voltage region as shown by the curve R. As explained above, resistance Rr is adjusted so that the dissonant voltage corresponds to the low value of line voltage at which it is desired to introduce a boost in the line voltage. In Figure 5, the dissonant point is located at 115 volts. It will be observed that under this condition, the resonant voltage of the circuit is approximately 145 volts.

While in the regulator circuit shown in Figure 1 I have described the resonant voltage as occurring at 125 volts and the dissonant voltage at 115 volts, it will be understood that the dissonant voltage may be adjusted to fall very close to the resonant voltage. For example, it is possible to adjust the circuit so that the dissonant voltage is only one-half volt less than the resonant voltage.

The action of resistances Ro and Rr in fixing the resonant and dissonant points may be explained as follows: When the applied voltage is lower than the resonant voltage, the current in the resonant circuit is not sufficient to saturate reactor 6 and the inductive reactance of this element (and of reactor 8) is too high to resonate with condenser 7. As the voltage rises, the increased current in reactor 6 begins to saturate the reactor and reduce its inductive reactance, and when the voltage reaches the resonant value, the combined reactance of reactors 6 and 8 is equal to the reactance of condenser 7, and the current suddenly increases to a large value as shown in Fig. 5. If a portion of the current is shunted around reactor 6, increased voltage must be applied to the circuit in order to saturate the reactor and produce resonance, and in this way the resonant point is controlled by adjusting the value of resistance Ro connected in shunt to a portion of (or the whole of) reactor 6.

When the applied voltage is above the resonant point, reactor 6 is saturated and operates under a condition such that its reactance decreases with increased current and vice versa. Accordingly, the shunting of resistance Rr across a portion of (or the whole of) reactor 6 will decrease the current in the reactor, thereby increasing the reactance for any given applied voltage, and, with increased reactance, the voltage at which the inductive reactance increases to a value sufficient to cause dissonance, is higher than in the case of no shunting.

It is known that by increasing the resistance of a series resonant circuit the dissonant voltage may be made to come nearer to the resonant voltage, and at a certain resistance value, the "hysteresis" effect in the characteristic substantially disappears. The resonant point is also shifted to higher values for increasing series resistance but not to the same extent as the dissonant point, and the current values above the resonant point are materially reduced. The curve P in Figure 5 represents the characteristic of the circuit when the resistance is increased to a point such that the characteristic for increasing voltages follows substantially the same line as for decreasing voltages. Note the change in shape of the curve and the reduction in current values above resonance. Curve P is not suitable for operating an ordinary relay which requires a comparatively large current for operation and a comparatively small current for release. On the other hand, by using a resonant circuit of comparatively low resistance value and arranging the relay to change the reactance value of one of its elements, an arrangement is obtained in which the "pick-up" and "drop-out" points may be made to lie very close together and still retain the advantage of a large change in current at these two points, thereby permitting the use of an ordinary electromagnetic relay of simple and rugged construction.

Any increase in resistance of the elements included in the series resonant circuit as by increase in temperature, tends to shift the resonant point of the circuit to slightly higher voltages. On the other hand, increase in the value of resistances Ro and Rr due to changes in temperature tends to shift the resonant and dissonant points to lower voltages. Where the temperature effect of resistances Rr and Ro overbalances the temperature effect of reactors 6 and 8, a compensating coil 9 is included in series with the circuit having a positive temperature coefficient and of sufficient resistance to compensate for the variation due to temperature changes. The coil 9 may be formed of an air-core coil of copper wire, or it may be formed simply as a resistance unit. By proper design of the elements 6 and 8, the temperature effects of these two elements may be made to exactly balance the temperature effect of resistances Ro and Rr, and the coil 9 will not be needed. Also, by using elements of low resistance, and reducing the range of temperature change, the temperature shift will not be appreciable.

Figure 2:
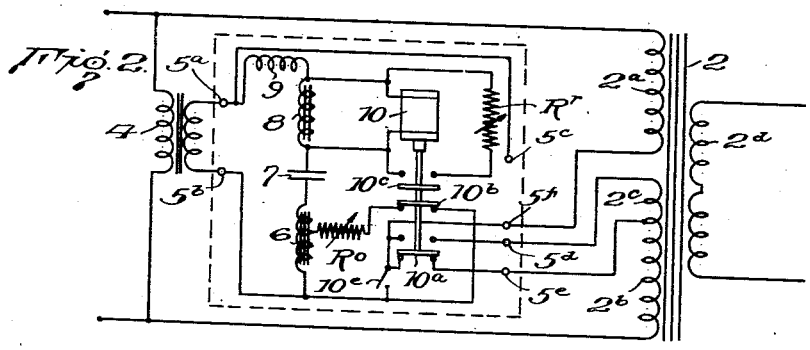
Figure 2 is a circuit diagram of a modification of the regulator shown in Figure 1.

In the modified arrangement shown in Figure 2, the relay 3 is omitted and the switching of the transformer taps is accomplished by contact 10a on relay 10 arranged to function in the same manner as contact 3a on relay 3. An additional contact may be provided on relay 10 to control a protective reactor like reactor 2e in Figure 1. The voltage-sensitive circuit in this arrangement also differs from the arrangement shown in Figure 1 in that the release resistance Rr is connected in shunt to the winding of relay 10 by contact 10c and, therefore, in shunt to inductance coil 8. In this arrangement, reactor 6 is saturable as in Figure 1, and reactor 8 is designed to be saturated, or partially saturated, at current values between the resonant and dissonant points. Adjustment of resistance Ro determines the voltage at which the circuit goes into resonance at at which relay 10 will operate, and adjustment of resistance Rr will determine the dissonant point, or the voltage at which relay 10 will drop out. The effect of resistance Rr is to increase the effective inductance of reactor 8 and thereby raise the dissonant voltage as explained above for reactor 6 in Figure 1.

The operation of the arrangement shown in Figure 2 will be clear from the above description of the operation of Figure 1. It will be seen that normally relay 10 is de-energized and contact 10a is in a position to introduce a definite boost in the voltage of the load circuit, and, in case the line voltage rises above a given value, relay 10 is energized and operates to change the contacts of the primary winding of transformer 2 to remove the boost. In case the line voltage drops below a value lower than the dissonant voltage point, relay 10 releases and reintroduces the boost. The control circuit of Fig. 2 may be used in Figure 1 by connecting relay 3 across terminals 5c—5d and closing switch 10e.

Figure 3:
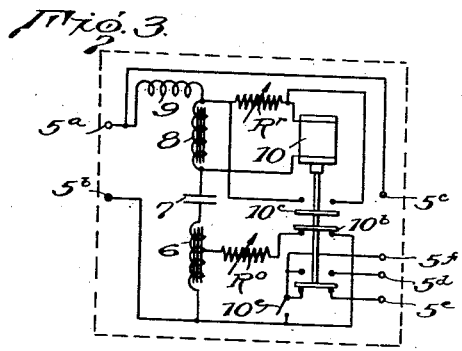
Figures 3 and 4 are circuit diagrams showing modified arrangements of the voltage sensitive circuit employed in my regulator systems.

In the modified control relay shown in Figure 3 the arrangement is substantially the same as that shown in Figure 1 except that the variable release resistance Rr is connected in series with the winding of relay 10, and is short-circuited by contact 10c when the relay operates. Both reactors 6 and 8 should be saturable or partially saturable. As in the arrangements shown in Figures 1 and 2, adjustment of resistance Ro determines the voltage at which the relay will pick up, and adjustment of the resistance Rr determines the release voltage. Short-circuiting by resistance Rr requires more impressed voltage to produce the same saturation of reactor 8 and shifts the resonant and dissonant voltages to higher values. The control circuit of Figure 3 may be used in the regulator system of Figure 1 by connecting relay 3 to terminals 5c and 5d and closing switch 10e, and it may be used in the regulator of Figure 2 by connecting the tap leads of transformer 2 to terminals 5f, 5d and 5e as in Fig. 2, leaving switch 10e open.

Figure 4:
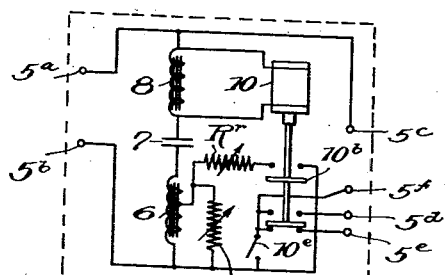

The control circuit shown in Figure 4 is substantially like that shown in Figure 1 except that the variable operate resistance Ro is connected directly in shunt to a portion of saturable reactor 6, and release resistance Rr is arranged to be connected in parallel with Ro by contact 10b when relay 10 operates. In this arrangement, Ro alone determines the point of operation (resonant point), while the combined resistance of Ro and Rr determines the point of release of the relay 10 (dissonant point).

Figure 6:
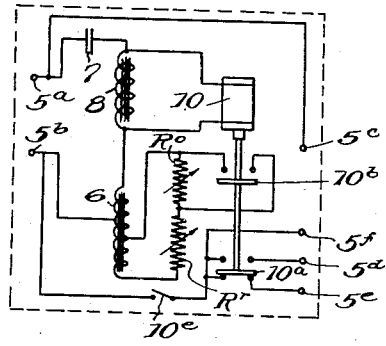
Figures 6 and 7 are circuit diagrams illustrating further modifications of the voltage sensitive circuit employed in my regulator systems.

In the modified control circuit shown in Figure 6, resistances Ro and Rr are connected in series across a portion of the saturable reactor 6, and contact 10b is arranged to short-circuit resistor Ro when relay 10 operates. The combined resistance of Rr and Ro determines the voltage at which the relay 10 will pick up (the resonant point), and adjustment of resistance Rr will determine the voltage at which the relay will release (the dissonant point). Short-circuiting of resistance Ro decreases the value of the shunting resistance, thereby increasing the effective inductance of saturated reactor 6 and increasing the resonant and dissonant voltages of the tuned circuit. While terminal 5b is shown connected to a tap on reactor 6, this terminal may be connected to the lower end of the reactor so as to include the entire reactor in the tuned circuit if desired.

Figure 7:
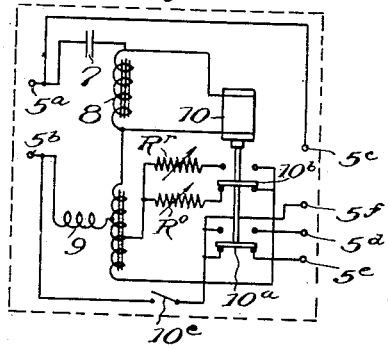

The control circuit shown in Figure 7 is a combination of features shown in Figures 1 and 6. The arrangement of the elements in the series resonant circuit is the same as in Figure 6, and the arrangement of the release and operate resistances Rr and Ro is substantially like that shown in Figure 1 except that these two resistances are shown connected to the same tap on saturable reactor 6. The operation of this arrangement is clear from the foregoing description of operation of Figures 1 and 6.

Figure 8:
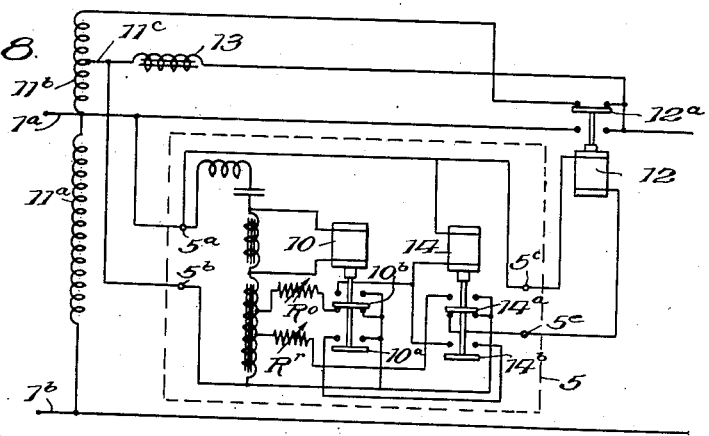
Figure 8 is a schematic circuit diagram showing a regulator system according to my invention for controlling the voltage of a booster transformer.

In Figure 8, I have shown a regulator system for changing the connections on a booster transformer to increase or decrease the line voltage. The booster transformer consists of a primary winding 11a connected in shunt to the transmission lines and a current winding 11b provided with a center tap 11c. A relay 12 provided with a contact 12a is arranged to connect the current winding 11b of the booster transformer in series with line conductor 1a when the relay operates, and to exclude the booster series winding from the line when the relay is de-energized. Relay 12 is energized from a voltage sensitive network or circuit shown in the dotted rectangle 5 which in turn is connected across one-half of the booster winding 11b, although this network may be connected across the entire winding 11b if desired. An impedance coil 13 may be connected between the center tap 11c to the far side of the contacts on relay 12 in order to prevent complete opening of the circuit of conductor 1a when the contact of relay 12 is moved from one position to another. This impedance coil and its connection is not essential and may be omitted if desired.

The voltage sensitive circuit shown in Figure 8 differs from the arrangements previously described in that a second relay 14 is interposed between relay 10 and relay 12. As shown, contact 10b normally connects resistance Ro in shunt to a portion of saturable reactor 6, and in its upper position it closes a circuit to energize relay 14. Contact 14a of relay 14 normally completes a circuit for energizing relay 12 from across the input terminals 5a and 5b, and this contact serves to connect variable resistance Rr in shunt to a portion of reactor 6 when relay 14 is energized. Contacts 10a and 14b serve to complete a holding circuit for relay 14 independently of contact 10b. The contacts on relay 10 are arranged so that upon release of the relay, contact 10b engages its lower contacts before contact 10a opens the circuit of relay 14. This prevents release of relay 14 before resistance Ro is connected to reactor 6.

Any of the control circuits shown in Figures 1 to 4, 6, 7 and 10 may be employed in Figure 8 by connecting relay 12 across terminals 5c and 5e and closing switch 10e. The control circuit of Figure 8 may be used in Figure 1 by providing a normally open contact on relay 14 and arranged like contact 10a in Figure 1 for controlling relay 3. The control circuit of Figure 8 may also be used in Figure 2 by providing an extra contact on relay 14 and arranged like contact 10a in Figure 2 for controlling the tap connections on transformer 2.

Figure 9:
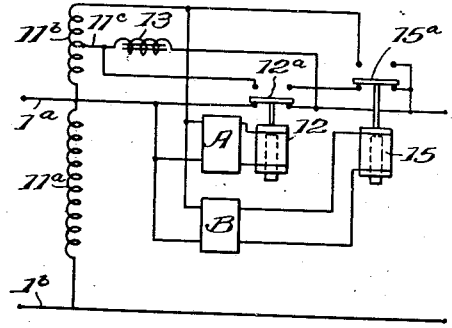
Figure 9 is a circuit diagram showing a modification of the regulator system of Figure 8 involving two steps of voltage change.

The regulator circuit shown in Figure 9 is a modification of the arrangement shown in Figure 8 in which two steps of voltage boost are provided. Contact 12a of relay 12 completes the circuit of line conductor 1a for no-boost condition in its lower position. In the upper position of relay 12 one-half of the series winding 11b is included in the conductor 1a through the connection from the tap 11c and including contact 12a and the back or lower contacts of contact 15a on relay 15. In the upper position of relay 15 contact 15a connects the entire booster winding 11b in series with conductor 1a. Voltage sensitive control circuits A and B are arranged to operate relays 12 and 15 respectively, and these control circuits may take the form of the voltage sensitive relay circuits shown in the dotted rectangles 5 in any of Figures 1 to 4, 6, 7 and 10, the relays 12 and 15 being connected across terminals 5c and 5e and switch 10e in closed position. Circuit B is adjusted to resonate when the line voltage exceeds the normal value by a given amount and circuit A is adjusted to resonate at the highest permissible line voltage. Circuit B drops out of resonance at a voltage less than normal by a given amount, and circuit A drops out of resonance at the lowest permissible line voltage.

The operation of Figure 9 is as follows: So long as the line voltage is normal, or above normal, both of the control circuits A and B are in resonance and the relay 10 of each control circuit is in operated position, the windings of relays 12 and 15 are de-energized and the connections are as shown in the drawings. In case the voltage drops below normal, control circuit A first goes out of resonance and releases its relay which in turn energizes the winding of relay 12 which operates and connects one-half of the booster winding in series with line conductor 1a. In case the line voltage should drop still further below the point of operation of relay 12, control circuit B goes out of resonance and releases its relay which in turn energizes the winding of relay 15, and relay 15 operates to connect the entire booster winding 11b in series with line 1a to obtain the full amount of the boost. As the line voltage is restored to normal, contact circuit B resonates and de-energizes relay 15, and then control circuit A resonates and de-energizes relay 12.

Figure 10:
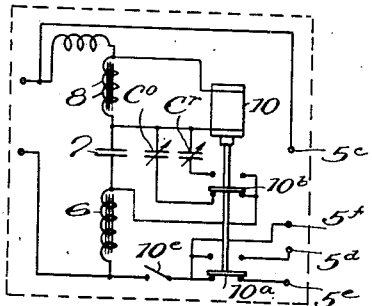
Figure 10 is a modified voltage-sensitive circuit in which the capacity reactance of the circuit is varied by the relay.

In Figure 10, I have shown a control circuit in which the capacitive reactance of the circuit is varied to shift the resonant and dissonant points instead of changing the inductive reactance. In this arrangement, contact 10b on relay 10 is arranged to normally connect a variable condenser Co in shunt to condenser 7, and when the relay operates, a variable condenser Cr is connected in shunt to condenser 7. Adjustment of condenser Co will vary the effective capacity of the resonant circuit and will fix the pick-up voltage of the circuit, while adjustment of condenser Cr will fix the voltage at which the relay will drop out or release. Increased capacity shifts the resonant and dissonant points to higher voltages. Reactor 6 is saturable. While the arrangement of Figure 10 will permit adjustment of the resonant and dissonant voltages, I prefer to use the control circuits in which adjustment is obtained by controlling the current paths through and in shunt with the inductive reactance of the tuned circuit.

In the arrangement shown in Figure 11, the voltage sensitive circuit shown in dotted rectangle 5 operates to connect and disconnect condensers across the transmission lines 1a, 1b and 1c and to thereby control the voltage in the line. The voltage control circuit of Figure 11 differs in several respects from the control circuits shown in other figures, but like elements are indicated by like reference numerals. Relay 10 is energized from across reactor 8, and contact 10b normally connects operate resistor Ro in shunt to a portion of saturable reactor 6, while contact 10c connects release resistor Rr in shunt to the winding of relay 10 when the relay operates. Contact 10a on relay 10 operates to complete a circuit to energize a slow-acting relay S in both positions; in the lower position the circuit is completed through contact 4 on relay M, and in the upper position it is completed through contact 3 on relay M.

Slow-acting relay S may be of any suitable construction to obtain delayed operation of the relay contacts and quick release. Simply for the purpose of illustration, I have shown this relay as being formed of an electro-magnet with a plunger armature, the armature being provided at one end with a dash-pot arrangement D. A by-pass Da is provided on the cylinder of the dash-pot extending from one side of the piston to the other, and a variable restriction Db is provided in the by-pass in order to vary the time of operation of the relay. Suitable means such as a check valve is provided either in the piston or in the by-pass to permit quick release of the relay. The time delay relay may conveniently take the form of well known electric clock operated switch or other form of time switch having delayed operation and quick release.

The normally open contact of relay S controls the energizing circuit of relay O through the normally closed contact #1 of the M relay. After the O relay has operated, a circuit is complete for operating the NVR relay and the M relay through the (f) contact of the O relay. Operation of relay M opens the circuit of relay S at contact M4 and opens the circuit of relay O at contact M1, but a holding circuit for relay O extends through its contact (b) and contact (c) on relay R. Relay M also prepares a circuit for operating relay R through contact M2 when relay S closes, and prepares a circuit for operating relay S through contacts M3 and contact 10a on relay 10 when this relay operates. By this arrangement only one time delay relay is required to control relays R and O. A variable portion of resistance Rr is normally short-circuited by contact (b) on relay R, and a variable portion of resistance Ro is short-circuited by contact (c) on relay O when this relay operates.

The no-voltage release relay NVR is arranged to control the energizing circuit of relay 10 by its contact (c), and relay NVR is energized by current from input terminals 5a and 5b through a circuit which includes in serial circuit relation contact (a) on relay NVR and the normally open contact (f) on relay O which is controlled by slow-acting relay S. Relay NVR is arranged so that its contact (c) is normally open and the relay does not operate until the line voltage has remained high enough for a time sufficient to allow relay S to come to its completely operated position and closes the circuit to relay O. The NVR relay holds operated through its own operated contact (b) directly to the line independently of relay O.

The regulator system of Figure 11 is shown as applied to a three-phase line having transmission conductors 1a, 1b and 1c. A transformer 16 is connected across one phase of the line and is provided with a secondary winding 16a which supplies current to the input terminals of the control circuit 5, and a second secondary winding 16b supplies current for operating an electromagnetic switch 17 which connects condensers C1, C2 and C3 across the line. In practice, the winding 16a would conveniently supply 120 volts to the control circuit 5 while winding 16b would supply 240 volts to switch 17, although it will be understood that switch 17 and its control relays may be operated from winding 16a if desired. The energizing circuit for switch 17 preferably includes a rectifier REC and the contacts of control relay 18. Relay 18 is energized from winding 16b through a circuit which includes a normally closed contact of relay 19, and contact (d) of relay O. When switch 17 is operated, it is latched in operated position by a latch element 20 engaging a projection on the armature of the switch, and contact 17a carried by the armature of the switch closes the normally open energizing circuit of relay 19, and operation of this relay opens the circuit of relay 18 which in turn opens the energizing circuit of switch 17. The upper contacts on relay 19 close a holding circuit for this relay through contact (d) on relay O. Contact 17b carried by the armature of switch 17 closes a normally open contact in the energizing circuit of trip relay 21 which also includes the normally open contact (d) of relay R and normally closed contact (e) of relay O. The purpose of relay 19 is to disconnect relays 17 and 18 from the source and prevent waste of energy while relay 17 is held in latched position. It is obvious that relay 19, latch 20, and trip magnet 21 may be omitted, and relay 18 would then be controlled simply by contact (d) of relay O. In this case, contact (d) on relay R, contact (e) on relay O, and contacts 17a and 17b would not be used. It is also obvious that contact (d) on relay O may be used to open and close the circuit of switch 17 directly and omit relay 18.

In describing the operation of Figure 11, it will be assumed that the load feeder is connected to the line 1a—1b—1c by a step-down transformer such that the load voltage will correspond to the voltage supplied to the input terminals of control circuit 5. It will further be assumed that the regulator is to operate to connect the condensers across the line when the load voltage drops to 115 volts and to disconnect the condensers when the load voltage reaches 122 volts. Resistance Ro is adjusted so that with contact (c) on relay O closed, relay 10 will pick up at 122 volts, which will be known as the high operate condition, and when contact (c) on relay O is open resistance Ro has a value such that relay 10 will pick up at 116 volts, which condition will be known as the low operate condition. Resistance Rr is adjusted so that with contact (b) of relay R closed, relay 10 will release at approximately 121 volts, which will be known as the high release condition, and with contact (b) of relay R open, resistance Rr has a value such that relay 10 will release at 115 volts, which will be known as the low release condition.

Assume that the transmission line is dead and that the circuit arrangement is as shown in Figure 11 except that switch 17 has previously been operated and is now held in latched position by latch 20. Application of voltage to the transmission line will first operate slow acting relay S and this relay closes the energizing circuit for the relay O, which locks through its own contact (b) and contact (c) of the R relay normal. The operation of relay O operates relay M and the no-voltage release relay NVR which locks itself closed by its contact (b). It will be understood that contact (b) on NVR closes before its contact (a) opens. Relay NVR will remain operated through its contact (b) connected directly to the input line so that only a very low value of voltage or a complete line failure will cause the release of this relay. The operation of relay M opens the initial operating circuit of relay S and this relay now releases. Relay M acts as a master relay, switching the control of the slow-acting relay S from the released position of relay 10 to the operated position of this relay. Contacts 1 and 2 of relay M determine which of relays R and O shall be under the control of relay S, relay R being controlled through contact #2 when relay M is operated, and relay O being controlled through contact #1 when relay M is released.

Assume that when the power is initially applied to the line the voltage is 117 volts, relay O will close and lock after a time required for operation of relay S, and its contact (c) will set the control circuit to operate relay 10 at 122 volts. Operation of the relay O also operates the relay M which in turn releases the relay S. If the voltage should increase to 122 volts, relay 10 will operate and will remain operated only so long as the voltage remains above the high release value of 121 volts, fixed by resistance Rr. As soon as relay 10 operates, contact 10a closes the energizing circuit for relay S through #3 contact of the operated M relay.

If the rise in voltage to 122 volts is only temporary and does not last for a few seconds duration (or for a period of time required for operation of relay S) but drops below 121 volts before S operates, relay 10 will release and relay S will not have had time to close its contact. If, however, the voltage remains at 122 volts (or higher than 121 volts) for a period long enough for relay S to operate, this relay closes the circuit of relay R (thru contact #2 of M operated) and relay R operates and removes the short-circuit from around a portion of resistance Rr, thereby resetting the resonant circuit connected to relay 10 to release at 115 volts instead of at 121 volts. Relay R also opens the locking path for the O relay, releasing that relay. With relay O released, relay R locks operated through its own contact (a) and through contact (a) of relay O released. The purpose of locking R and O relays to each other in this manner is to prevent them from being both released at the same time thereby establishing an operate condition which will be lower than the release condition. Relay R also closes a circuit for energizing release magnet 21 through its contact (d) and contact (e) of the O relay, and operation of magnet 21 trips the latch 20 and disconnects condensers C1, C2 and C3 from the line, thereby removing the voltage boost.

Relays 10 and R remain operated so long as the line voltage remains above 115 volts, and the condensers remain disconnected from the line, but in case the line voltage drops to 115 volts, relay 10 releases and contact 10a closes the circuit for again energizing slow-acting relay S, and contact 10b resets the resonant circuit to operate relay 10 at 116 volts. If the drop in line voltage does not continue for a time sufficient for relay S to operate but rises above 116 volts, relay 10 will again pick up and prevent operation of relay S. If, however, the line voltage remains below 115 volts for a time sufficient for relay S to operate, then this relay closes and affects the operation of relay O which (1) opens the circuit of relay R through its (a) contact, (2) opens the external circuit through contact Oe by which magnet 21 operated, (3) operates relay M through contact Of, (4) locks itself operated through its own contact (d) and contact (c) of the released R relay, (5) resets the operate resistance Ro through contact Oc causing the resonant circuit to resonate at 122 volts, (6) closes a circuit at contact Od for operating relay 18, which in turn energizes switch 17, thereby connecting the condensers across the transmission line. The operation of relay M releases relay S which will be ready for the next operation of relay 10. Release of the R relay resets the release resistance for the high release of 121 volts.

The no-voltage release relay NVR is provided for the purpose of preventing chattering or periodic operation of relay 10 in case the voltage of the line when power is first applied is lower than the high release value and higher than the low operate value. This no-voltage release relay may be replaced by any suitable form of time delay switch which will delay the closing of the circuit of relay 10 until after the relay O has operated.

In Figure 12 I have shown a modification of the control circuit 5 of Figure 11. This arrangement is in general like that shown in Figure 11, except that the no-voltage release relay has been omitted and a different arrangement is employed for short-circuiting portions of resistances Rr and Ro. Contact 10a on relay 10 controls circuits for energizing slow-acting relay S; in the lower position of this contact a circuit is completed through contact (b) of relay K when K operates, and in the upper position of contact 10a a circuit is completed through contact (a) on relay W when W is released. Slow-acting relay S controls the energizing circuit of relay K through contact (b) of relay W when W is released, and it controls the circuit of release magnet Kr through contact (c) of relay W when W is operated. Contacts (a) and (d) on relay K are arranged to short-circuit variable portions of resistances Rr and Ro respectively when relay K is released. Contact (d) on relay W controls an external circuit by which a voltage boost is introduced into the line, such as the circuit for controlling switch 18 in Figure 11, and contact (e) of relay W controls the circuit which removes the boost from the line, such as the circuit for energizing trip relay 21 in Figure 11.

Operation of Figure 12 is as follows: It will be assumed that resistances Ro and Rr are adjusted for the same conditions of operation as described above for Figure 11. So long as the line voltage is below the high operate voltage (122 volts), the circuit arrangement is as shown in Figure 12 and the boosting apparatus is effective. In case the voltage exceeds 122 volts relay 10 operates and closes a circuit for slow-acting relay S in the upper position of contact 10a and through contact (a) on relay W. If the voltage returns below the high release value (121 volts) before relay S closes its contact, nothing further happens, but if the voltage remains above 121 volts until relay S closes its contact, then relay K is energized through a circuit completed by relay S and including contact (b) on relay W. Relay K operates and is latched in operated position by the latch Ka. Operation of relay K closes the circuit of relay W through its contact (c), and this relay operates and removes the boost from the line. Operation of K also resets the dissonant point of the resonant circuit at the low release voltage (115 volts), and also resets the resonant point at the low operate voltage (116 volts). Operation of relay W opens the circuit of relay S at its contact (a), opens the circuit of relay K at its contact (b) and prepares the circuit of trip magnet Kr at its contact (c).

So long as the voltage remains above the low release value (115 volts), relay 10 remains operated, but in case the voltage drops below 115 volts, relay 10 releases and closes a circuit for relay S through its contact 10a. If the line voltage should rise to 116 volts before relay S closes its circuit, relay 10 will again pick up and nothing further will happen. If, however, the line voltage remains below 115 volts until relay S closes its contact, a circuit will be completed by relay S through contact (c) on relay W to energize trip magnet Kr and thereby release relay K, which in turn opens the circuit of relay W. Release of relay W closes a circuit at its contact (d) for again operating the apparatus to boost the line voltage.

It is obvious that all of the contacts which are operated by relay W may be mounted upon and operated by relay K, thus omitting relay W. In this case, however, the contact corresponding to contact (b) on relay W should be arranged to remain closed long enough to carry the armature of relay K into the latching position.

The control circuits shown in Figures 11 and 12 may be employed in the regulator circuit of Figure 1 by controlling the circuit of relay 3 by contact (d) of relay R in Figure 11 or by contact (e) of relay W in Figure 12. These control circuits may also be employed in the regulator circuit of Figure 2 by arranging contact (d) of relay R in Figure 11 (on contact (e) of relay W of Fig. 12) to control the transformer tap connections in the same manner as contact 10a in Figure 2. These circuits may also be employed in the regulator arrangements of Figures 8 and 9 by controlling the circuits of relays 12 and 15 by contact (d) of relay O or by contact (e) of relay W.

It will be understood that the various forms of control circuits disclosed herein have been shown only for the purpose of illustrating the invention, and many changes may be made without departing from my invention. For example, in many of the control circuits, relay 10 may be connected directly in series with the resonant circuit by omitting reactor 8, or this reactor may be replaced by a resistance element. Also, in some cases, relay 10 may be connected across condenser 7 if desired.

From the foregoing it will be seen that according to my invention a ferro-resonant circuit having a characteristic with a pronounced hysteresis effect and with a discontinuous characteristic at the resonant and dissonant points, with a large ratio between the high and low values of currents at these points, may be employed as a voltage sensitive control relay responsive to a range of voltage variation considerably less than the normal separation between the resonant and dissonant points, while still retaining the advantage of the high ratio between the high and low currents at the resonant and dissonant points. This feature permits the use of simple and rugged electromagnetic relays for the positive control of switching circuits. I prefer to use resonant circuits of relatively low resistance, and the arrangements for shifting the resonant and dissonant points of the circuit are preferably such that the resistance of the circuit is not materially changed.

What I claim is:

1. A voltage sensitive circuit comprising a ferro-resonant circuit having a characteristic with a pronounced hysteresis effect, a relay operated by current flowing in said resonant circuit, and means responsive to the operation of said relay at resonance for acting upon an element connected in said resonant circuit externally of said relay to shift the dissonant point of the circuit nearer to the resonant point while maintaining the resistance of said circuit substantially unchanged and maintaining the resonant character of said circuit.

2. A voltage sensitive circuit comprising a resonant circuit including a saturable reactor and having a characteristic with a pronounced hysteresis effect, a relay operated by current flowing in said circuit at resonance, and means responsive to the operation of said relay for shunting a part of the current around said reactor to thereby shift the dissonant point of the circuit nearer to the resonant point while maintaining the resonant character of said circuit.

3. A voltage sensitive circuit including a ferro-resonant circuit having a characteristic with a pronounced hysteresis effect, a relay operated by current flowing in said circuit, means controlled by said relay in released position for fixing the resonant voltage of said circuit at a fixed value, means controlled by said relay and rendered effective a predetermined time after said relay moves into released position for fixing the resonant voltage of said circuit at a value higher than said fixed voltage, means controlled by said relay in operated position for fixing the dissonant point of said circuit at a voltage between said low and high resonant voltages, and means controlled by said relay and rendered effective a predetermined time after said relay is moved to operated position for fixing the dissonant point of said circuit at a voltage lower than the low resonant voltage.

4. A voltage sensitive circuit comprising a resonant circuit having a characteristic with a pronounced hysteresis effect, a relay operated by current flowing in said circuit, means responsive to the operation of said relay for shifting the dissonant point of the circuit nearer to the resonant point, and means controlled by said relay in operated position and rendered effective a predetermined time after operation of said relay for changing the dissonant voltage of said circuit to a different value.

5. A voltage sensitive circuit comprising a resonant circuit having a characteristic with a pronounced hysteresis effect, a relay operated by current flowing in said circuit, means controlled by said relay in released position for fixing the resonant voltage of said circuit, and means controlled by said relay in released position and rendered effective a predetermined time after movement of said relay to released position for changing the resonant voltage of said circuit to a different value.

6. A voltage sensitive circuit comprising a resonant circuit having a characteristic with a pronounced hysteresis effect, a relay operated by current flowing in said circuit, a delay relay controlled by said first relay in one of its positions, and means controlled by said delay relay for changing the characteristic of said resonant circuit.

7. Voltage sensitive means comprising a relay, a circuit for energizing said relay, means controlled by said relay in released position to modify said energizing circuit so that said relay will operate at a fixed value of voltage impressed on said energizing circuit, means controlled by said relay and rendered effective at a predetermined time after said relay moves into released position for setting said relay to operate at a voltage higher than said fixed voltage, means controlled by said relay in operated position for setting said relay for release at a voltage between the said low and said high operate voltages, and means controlled by said relay and rendered effective a predetermined time after said relay has moved to operated position for modifying said circuit to set said relay to release at a voltage lower than the low operate voltage.

8. Voltage sensitive means comprising a relay, a circuit for energizing said relay, means responsive to the operation of said relay for setting said relay to release at a definite value of voltage impressed upon said circuit, and means controlled by said relay in operated position and rendered effective a predetermined time after operation of said relay for setting said relay to release at a different value of voltage impressed upon said circuit.

9. Voltage sensitive means comprising a relay, an energizing circuit for said relay, means controlled by said relay in released position for setting said relay to operate at a definite value of voltage impressed upon said circuit, and means controlled by said relay in released position and rendered effective a predetermined time after movement of said relay to released position for setting said relay to operate at a different value of voltage impressed upon said circuit.

10. In combination, a transmission circuit subject to voltage variations, a voltage responsive control relay connected to said transmission circuit, means controlled by said control relay in released position for setting said control relay to operate at a voltage near the lower end of the permissible range of voltage variation on said transmission circuit, a time delay relay, means controlled by said control relay in operated position for energizing said delay relay, means controlled by said control relay in operated position for setting said control relay to release at a voltage near the upper limit of said range, means controlled by the operation of said time delay relay when said control relay is in operated position for setting said control relay to release at the lowest permissible voltage of said transmission circuit, means controlled by said control relay in released position for energizing said time delay relay, means controlled upon operation of said time delay relay when said control relay is in released position for setting said control relay to operate at the highest voltage of said range, means controlled jointly by said control relay and by said delay relay when in operated positions for decreasing the voltage of said transmission circuit, and means controlled jointly by said control relay in released position and by said delay relay in operated position for increasing the voltage of said transmission circuit.

11. A voltage sensitive circuit comprising a resonant circuit having a characteristic with a pronounced hysteresis effect, a relay operated by current flowing in said circuit, means including contacts controlled by said relay in released position for modifying the constants of said resonant circuit to fix the resonant voltage of said circuit at a predetermined value, and means including contacts controlled by said relay in operated position for fixing the dissonant voltage of said circuit at a different predetermined value.

12. A voltage sensitive circuit comprising a resonant circuit including a capacity element and an inductance of a predetermined total value, a relay operated by current flowing in said circuit, means controlled by said relay in released position for reducing the inductance in said circuit to a predetermined value, and second means controlled by said relay in operated position for reducing the inductance in said resonant circuit to a different predetermined value.

13. A voltage sensitive circuit comprising a resonant circuit including a capacity element and two reactor elements connected in series, a relay operated by current flowing in said circuit, contacts controlled by said relay in released position for shunting at least a portion of one of said reactor elements to fix the inductance of said circuit at a predetermined value, and contacts controlled by said relay in operated position for shunting at least a portion of one of said reactor elements to fix the inductance of said resonant circuit at a different predetermined value.

14. A voltage sensitive circuit comprising a resonant circuit including a saturable reactor and having a characteristic with a pronounced hysteresis effect, a relay operated by current flowing in said circuit, means including contacts controlled by said relay in released position for shunting at least a portion of said reactor to fix the inductance of said resonant circuit at a predetermined value, and contacts controlled by said relay in operated position to shunt at least a portion of said reactor to fix the inductance of said resonant circuit at a different predetermined value.

15. In combination, a transmission circuit subject to voltage variations, a relay, a voltage sensitive circuit connected to said transmission circuit for operating said relay including a ferro-resonant circuit having a characteristic with a pronounced hysteresis effect, means controlled by said relay in released position for fixing the resonant voltage of said resonant circuit at a voltage near the lower end of the permissible range of voltage variation, means controlled by said relay and rendered effective a predetermined time after said relay moves into released position for fixing the resonant voltage of said resonant circuit at the highest voltage of said range, means controlled by said relay and rendered effective a predetermined time after said relay moves into released position for increasing the voltage of said transmission circuit, means controlled by said relay in operated position for fixing the dissonant point of said resonant circuit at a voltage near the upper limit of said range, means controlled by said relay and rendered effective a predetermined time after said relay is moved to operated position for fixing the dissonant point of said resonant circuit at the lowest permissible voltage of said transmission circuit, and means controlled by said relay and rendered effective a predetermined time after said relay moves to operated position for decreasing the voltage of said transmission circuit.

16. In combination, an alternating current supply circuit subject to voltage variations, a load circuit, a transformer connecting said load circuit to said supply circuit and having a tapped winding providing different ratios of transformation between said circuits, an electromagnetic relay, a voltage sensitive circuit connected to said supply circuit for operating said relay and including a ferro-resonant circuit having a characteristic with a pronounced hysteresis effect, the resonant voltage of said resonant circuit being fixed at a predetermined voltage, and means controlled by said relay in operated position for fixing the dissonant voltage of said resonant circuit at a lower predetermined voltage, means controlled by said relay in released position for connecting said tapped winding to provide a certain ratio of transformation, and means controlled by said relay in operated position for connecting said tapped winding to provide a lower ratio of the load circuit voltage to the supply circuit voltage.

17. In combination, a transmission circuit subject to voltage variations, a relay, an energizing circuit for said relay connected to said transmission circuit, means controlled by said relay in released position for setting said relay to operate at a voltage near the lower end of the permissible range of voltage variation on said transmission circuit, means controlled by said relay and rendered effective a predetermined time after said relay moves into released position for setting said relay to operate at the highest voltage of said range, means controlled by said last named means for increasing the voltage of said transmission circuit after said predetermined time, means controlled by said relay in operated position for setting said relay to release at a voltage near the upper limit of said range, means controlled by said relay and rendered effective a predetermined time after said relay is moved to operated position for setting said relay to release at the lowest permissible voltage of said transmission circuit, and means controlled by said last mentioned means and rendered operative after said predetermined time for decreasing the voltage of said transmission circuit.

PALMER HUNT CRAIG.